(12) United States Patent
Shionoya

(10) Patent No.: US 7,473,456 B2
(45) Date of Patent: Jan. 6, 2009

(54) HONEYCOMB STRUCTURE

(75) Inventor: Wataru Shionoya, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/723,023

(22) Filed: Mar. 15, 2007

(65) Prior Publication Data

US 2007/0231536 A1 Oct. 4, 2007

(30) Foreign Application Priority Data

Mar. 28, 2006 (JP) ............................. 2006-087253

(51) Int. Cl.
*B32B 3/12* (2006.01)
(52) U.S. Cl. ...................................... 428/116
(58) Field of Classification Search ................. 428/116
See application file for complete search history.

(56) References Cited

U.S. PATENT DOCUMENTS

| 4,364,761 | A | * | 12/1982 | Berg et al. ..................... 55/523 |
| 6,596,666 | B1 | * | 7/2003 | Yamada ....................... 502/327 |
| 7,326,270 | B2 | | 2/2008 | Hong et al. |
| 2005/0178098 | A1 | * | 8/2005 | Ono et al. ..................... 55/523 |
| 2006/0191245 | A1 | | 8/2006 | Bardon |

FOREIGN PATENT DOCUMENTS

| EP | 1 726 800 A1 | 11/2006 |
| EP | 1 738 813 A1 | 1/2007 |
| EP | 1 752 630 A1 | 2/2007 |
| FR | 2 857 695 A1 | 1/2005 |
| JP | A-09-313849 | 12/1997 |
| JP | A-10-059784 | 3/1998 |
| JP | A-2001-138416 | 5/2001 |
| WO | WO 2004/024294 A1 | 3/2004 |

* cited by examiner

*Primary Examiner*—Timothy M Speer
*Assistant Examiner*—Gordon R Baldwin
(74) *Attorney, Agent, or Firm*—Oliff & Berridge, PLC (57) ABSTRACT

There is disclosed a honeycomb structure that is useful as a filter for trapping an exhaust gas, in particular, a diesel particulate filter (DPF) for trapping particulate matter (particulates) in an exhaust gas from a diesel engine, that prevents displacement of honeycomb segments during canning or use (under vibration) and that effectively prevents defects such as a crack due to thermal stress during use and regeneration. The honeycomb structure includes a honeycomb segment joined body having a plurality of honeycomb segments 2 joined integrally at respective joining surfaces via a joining material layer 20; and an outer peripheral coating layer covering an outer peripheral surface of the honeycomb segment joined body, the honeycomb structure having such a structure that a plurality of cells acting as fluid passageways are arranged in parallel to each other in the direction of a center axis, wherein sides 11 of a cross-sectional shape of the plurality of honeycomb segments 2 in a direction perpendicular to the center axis direction have a curvature equal to or greater than 1.

9 Claims, 8 Drawing Sheets

MEASUREMENT OF BREAKING STRENGTH

FIG.8(b)

BREAK MODE 1

FIG.8(c)

BREAK MODE 2

HONEYCOMB STRUCTURE

BACKGROUND OF THE INVENTION

1. Field of the Invention

The present invention relates to a honeycomb structure including a plurality of honeycomb segments joined integrally with a joining material layer. More specifically, the present invention relates to a honeycomb structure that effectively prevents generation of defects such as a crack caused of thermal stress that occurs in use and in regeneration of the honeycomb structure which is useful as an exhaust gas trapping filter, in particular, a diesel particulate filter (DPF) for trapping particulate matter (particulates) contained in the exhaust gas from a diesel engine.

2. Description of the Related Art

A honeycomb structure is incorporated in the exhaust system of a diesel engine or the like as a diesel particulate filter (DPF) as a filter to trap an exhaust gas for example in order to trap and remove particulate matter (particulates) contained in an exhaust gas from a diesel engine or the like. Such a honeycomb structure is prone to show uneven rise in temperature on the entire honeycomb structure when the honeycomb structure is in use (when trapping and removing particulates) and when the honeycomb structure is being regenerated (when burning and removing particulates deposited in a filter in order to remove the increase in the pressure loss caused by particulates chronologically deposited in the filter), thus being likely to cause defects such as a crack due to thermal stress. In order to eliminate such a disadvantage, a honeycomb structure has been proposed that reduces thermal stress through a constitution of a honeycomb segment joined body where a plurality of honeycomb segments comprising silicon carbide (SiC) with excellent heat resistance are joined integrally at respective joining surfaces via a joining material layer.

An SiC honeycomb structure is constituted by joining a plurality of honeycomb segments with a joining material as mentioned above. In case the adhesion of respective honeycomb segments is weak, longitudinal displacement (in the axis direction) or transverse displacement (normal to the axis direction) occurs in canning or in use (under vibration). To offset such a disadvantage, a honeycomb structure has been proposed that uses honeycomb segments whose flatness of the surface of its outer periphery is 0.2 mm or above (refer to JP-A-2001-138416).

SUMMARY OF THE INVENTION

The present invention has been accomplished in view of the above-mentioned problems, and an aim of the present invention is to provide a honeycomb structure that is useful as a filter for trapping an exhaust gas, in particular, a diesel particulate filter (DPF) for trapping particulate matter (particulates) in an exhaust gas from a diesel engine, that prevents displacement of honeycomb segments in canning or in use (under vibration) and that effectively prevents defects such as a crack due to thermal stress in use and in regeneration.

To attain the above object, the present invention provides a honeycomb structure comprising a honeycomb segment joined body having a plurality of honeycomb segments joined integrally at respective joining surfaces via a joining material layer and an outer peripheral coating layer covering an outer peripheral surface of the honeycomb segment joined body, the honeycomb structure having such a structure that a plurality of cells acting as fluid passageways are disposed in parallel to each other in the direction of a center axis, wherein sides of a cross-sectional shape of the plurality of honeycomb segments in a direction perpendicular to the center axis direction has a curvature equal to or greater than 1.

In the present invention, a curvature radius of the curvature equal to or greater than 1 preferably falls within the range of 300 to 700 mm from the viewpoint of prevention of displacement of honeycomb segments.

In the present invention, the sum of the curvature radiuses of the sides of the cross-sectional shape perpendicular to the center axis direction of the respective honeycomb segments adjacent to each other via the joining material layer is preferably 800 to 1400 mm.

Furthermore, in the present invention, the sides of the cross-sectional shapes perpendicular to the center axis direction of the honeycomb segments adjacent to each other via the joining material layer are preferably formed of a combination of a recess and a projection, and a ratio of the combination of the recess and the projection at the sides of the cross-sectional shapes is preferably 50 percent or above.

A honeycomb segment whose cross-sectional shape is approximately rectangular is preferably used in the invention.

As described above, the honeycomb structure according to the present invention is useful as a filter for trapping an exhaust gas, in particular, a diesel particulate filter (DPF) for trapping particulate matter (particulates) in an exhaust gas from a diesel engine, prevents displacement of honeycomb segments in canning or in use (under vibration) and effectively prevents defects such as a crack due to thermal stress in use and in regeneration.

DESCRIPTION OF THE PREFERRED EMBODIMENT

Embodiments of the invention will be described. The invention is not limited to these embodiments but may be variously changed, modified, improved or replaced based on the knowledge of those skilled in the art without departing from the scope of the invention.

Figure 3:
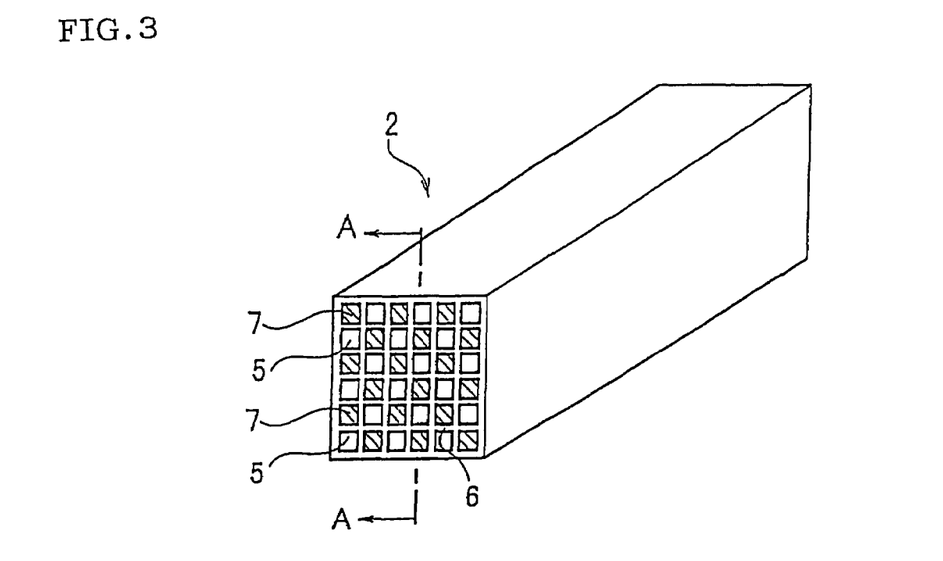
FIG. 3 is a schematic perspective view schematically illustrating a honeycomb segment used in another embodiment of a honeycomb structure according to the present invention.
Figure 4:
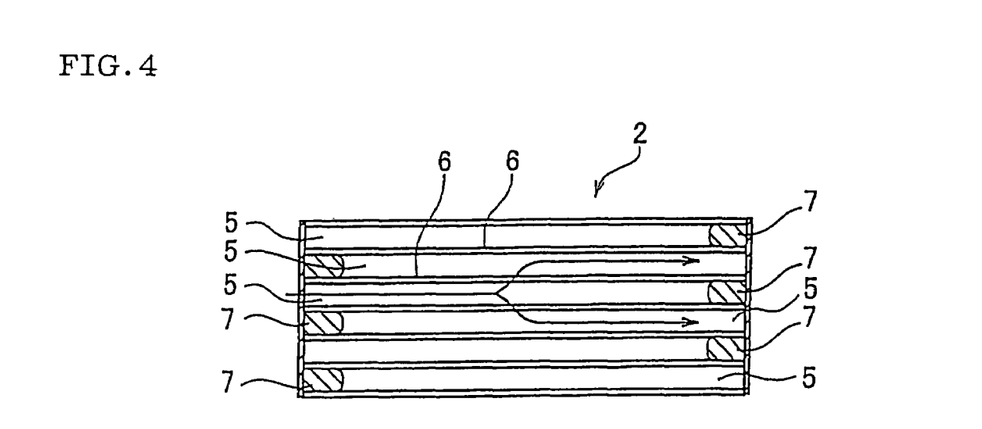
FIG. 4 shows a cross sectional view, taken along line A-A of FIG. 3.
Figure 5:
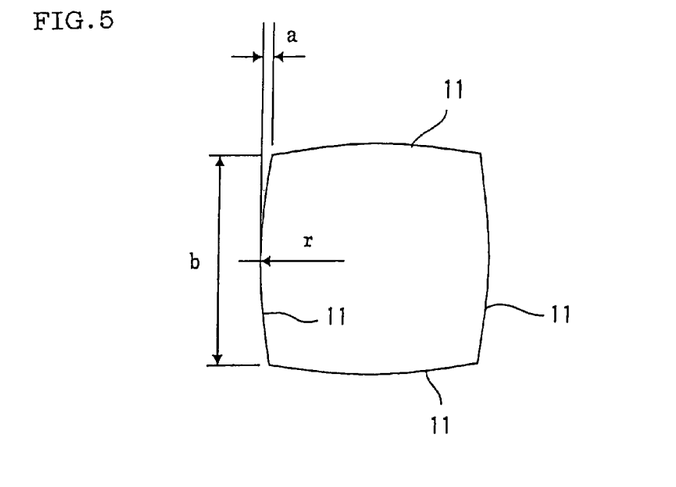
FIG. 5 is an explanatory view for illustrating obtaining a curvature radius of a curvature of a side of a cross-sectional shape in a direction perpendicular to the center axis direction of a honeycomb segment.
Figure 6A:
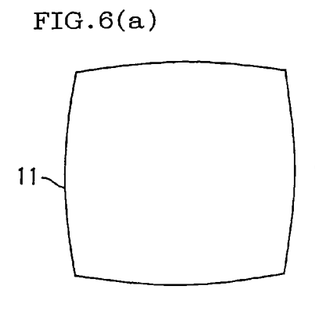
FIG. 6 is an explanatory view schematically illustrating examples of honeycomb segments having various cross-sectional shapes.
Figure 6B:
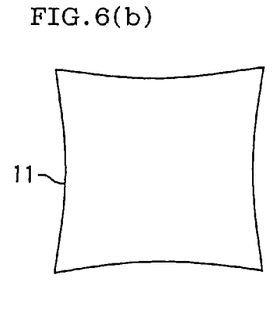
Figure 6C:
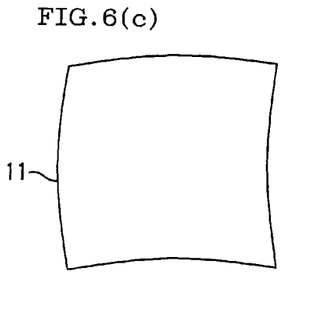
Figure 6D:
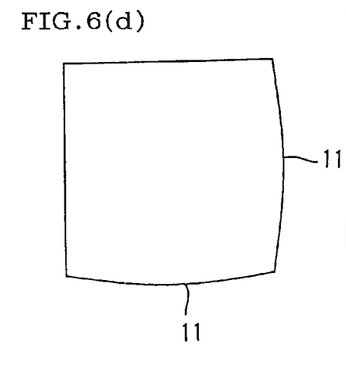
Figure 6E:
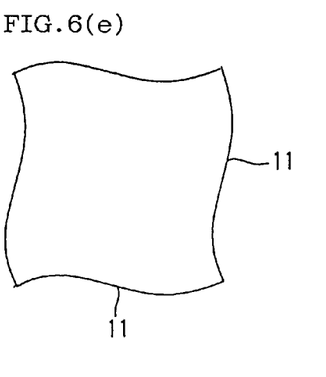

As shown in FIGS. 1 to 4, a honeycomb structure 1 according to an embodiment of the present invention comprises a honeycomb segment joined body 10 having a plurality of honeycomb segments 2 joined integrally at respective joining surfaces via a joining material layer 9; and an outer peripheral coating layer 4 covering the outer peripheral surface of the honeycomb segment joined body 10, the honeycomb structure 1 having such a structure that a plurality of cells 5 acting as fluid passageways are arranged in parallel to each other in the direction of a center axis, wherein the sides 11 of a cross-sectional shape of the plurality of honeycomb segments 2 in a direction perpendicular to the center axis direction have a curvature equal to or greater than 1. Here, as shown in FIG. 5, the curvature radius (r) of the curvature at the side 11 of the cross-sectional shape is a value obtained from $$r=(4a^2+b^2)/(8a).$$

The structure of the honeycomb structure 1 according to the embodiment of the present invention will be described in detail. The honeycomb structure 1 according to the embodiment of the present invention has such a structure that a plurality of cells 5 acting as fluid passageways defined by porous partition walls 6 are disposed in parallel to each other in the direction of the center axis of the honeycomb structure 1, and comprises the honeycomb segment joined body 10 having a plurality of honeycomb segments 2 joined integrally via the joining material layer 9, with each of the honeycomb segments 2 having a shape to constitute part of the whole structure and also having a shape to constitute the whole structure when being assembled together in a direction perpendicular to the center axis of the honeycomb structure 1; and the outer peripheral coating layer 4 covering the outer peripheral surface of the honeycomb segment joined body 10. After the honeycomb segments 2 are joined together with the joining material layer 9, grinding is performed so that the cross-sectional shape of the whole taken along a plane perpendicular to the center axis of the honeycomb structure 1 will be a circle, an ellipse, a racing track, or a partially modified shape thereof, and the outer peripheral surface is covered by the outer peripheral coating layer 4. In case the honeycomb structure 1 is used as a DPF, the honeycomb structure may be disposed in the exhaust system of a diesel engine to trap particulate matter (particulates) including soot exhausted from a diesel engine. By the way, in FIG. 1, cells 5 and partition walls 6 are shown in one honeycomb segment 2 only. As shown in FIGS. 3 and 4, each honeycomb segment 2 has a shape that constitutes part of the whole structure of the honeycomb structure 1 (honeycomb segment joined body 10) (see FIG. 1) and also has a shape that constitutes the whole structure when being assembled together in a direction perpendicular to the center axis of the honeycomb structure 1 (see FIG. 1). The cells 5 are disposed in parallel to each other in the direction of the center axis of the honeycomb structure 1 and the ends of the adjacent cells 5 are alternately plugged with a filling material 7.

Figure 2:
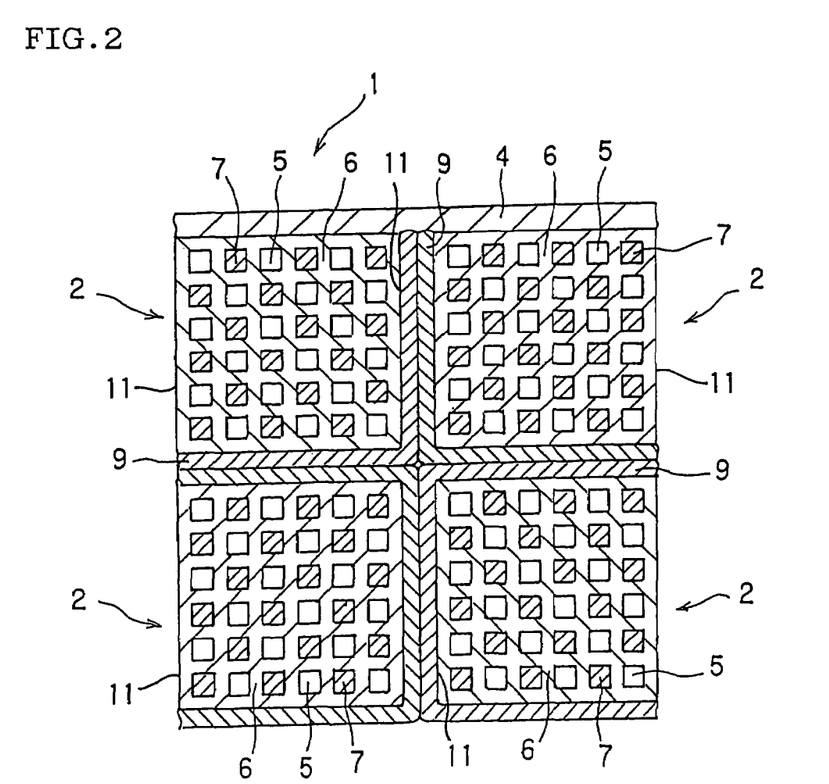
FIG. 2 is a partial front view of another embodiment of a honeycomb structure according to the present invention, viewed from the end surface side (with the entire structure having a square cross-sectional shape taken along a plane perpendicular to the center axis)

A predetermined cell 5 (inflow cell) has its left end open while its right end plugged with the filling material 7, as shown in FIGS. 3 and 4. Another cell 5 (outflow cell) adjacent to that cell 5 (outflow cell) has its left end plugged with the filling material 7 while its right end open. With such plugging, the end surface of the honeycomb segments 2 appears in a checkered pattern as shown in FIG. 2. In case the honeycomb structure 1 where a plurality of honeycomb segments 2 are joined together is disposed in the exhaust system for an exhaust gas, the exhaust gas advances from the left side in FIG. 4 to into the cell 5 of each honeycomb segment 2 and moves rightward.

In FIG. 4, the left end of the honeycomb segment 2 serves as an inlet of an exhaust gas. Exhaust gas flows into the honeycomb segment 2 from the cell 5 (inflow cell) that is open without being plugged. Exhaust gas flows into the cell 5 (inflow cell), passes through the porous partition wall 6, and flows out from another cell 5 (outflow cell). When the exhaust gas passes through the partition wall 6, particulate matter (particulate) containing soot in the exhaust gas is trapped by the partition wall 6. In this way, purification of an exhaust gas is performed. Particulate matters (particulates) containing soot are chronologically deposited in the honeycomb segment 2 to increase the pressure loss in the trapping process, and regeneration takes place where soot or the like is combusted. While the honeycomb segment 2 the entire section of which is an approximately square shape is shown in FIGS. 2 to 4, the honeycomb segment 2 may have a shape of a rectangle or a partially modified rectangle. The cross-sectional shape of the cell 5 may be a polygon, a circle, an ellipse, a racing track, or a partially modified shape thereof.

The honeycomb structure according to the present invention generally has the structure described above. In the present invention, as shown in FIGS. 6(a) to 6(e), the sides 11 of a cross-sectional shape of a plurality of honeycomb segments 2 in a direction perpendicular to the center axis direction have a curvature equal to or greater than 1.

Figure 7:
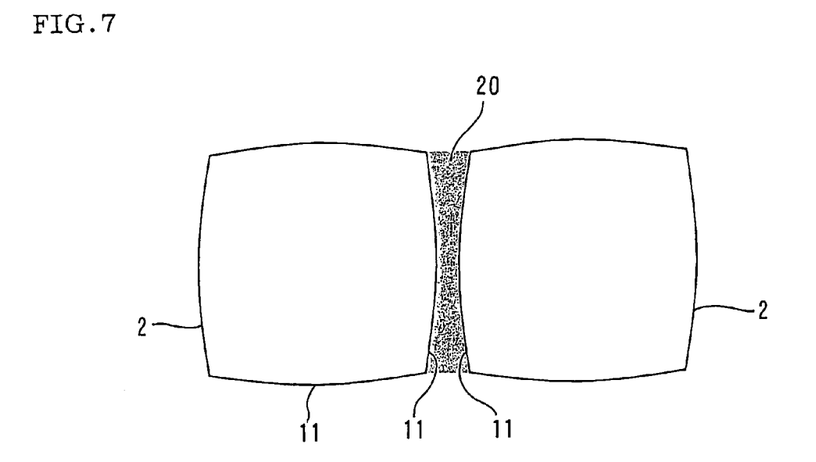
FIG. 7 is an explanatory view schematically illustrating an example of a joined body comprising a pair of honeycomb segments joined to each other with a joining material.

In the present invention, the curvature radius of the curvature equal to or greater than 1 at the sides 11 preferably falls within the range of 300 to 700 mm from the viewpoint of prevention of displacement of honeycomb segments. In the present invention, from the same viewpoint, as shown in FIG. 7, the sum of the curvature radiuses of the sides 11 of the cross-sectional shapes perpendicular to the center axis direction of the respective honeycomb segments 2 adjacent to each other via the joining material layer 20 is preferably 800 to 1400 mm.

Further, in the present invention, the sides 11 of cross-sectional shapes perpendicular to the center axis direction of the honeycomb segments 2 adjacent to each other via the joining material layer 20 are preferably formed of a combination of a recess and a projection, and the ratio of the combination of a recess and a projection at the sides of the cross-sectional shapes is preferably 50 percent or more.

FIGS. 9(a) to 9(d) show examples where the sides 11 of the honeycomb segments 2 adjacent to each other are formed of a combination of a recess and a projection. As shown in FIGS. 9(a) to 9(d), a recess and a projection are preferably combined so that the sides 11 of the honeycomb segments 2 adjacent to each other are complementary to each other. In this examples, the thickness of the joining material layer 20 between the honeycomb segments 2 adjacent to each other is almost uniform, which ensures a uniform joining strength across the whole joining material layer 20. As a result, the joining strength (breaking strength) increases thus preventing displacement of honeycomb segments during canning or use (under vibration) and preventing defects such as a crack due to thermal stress during use and regeneration.

Figure 8A:
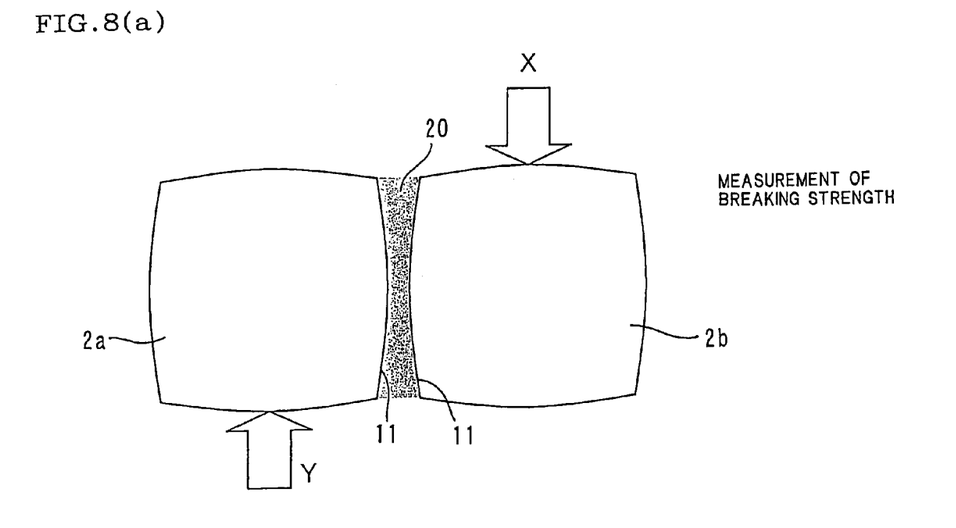
FIG. 8 is an explanatory view illustrating the breakdown mode of a joined material layer between adjacent honeycomb segments.
Figure 8B:
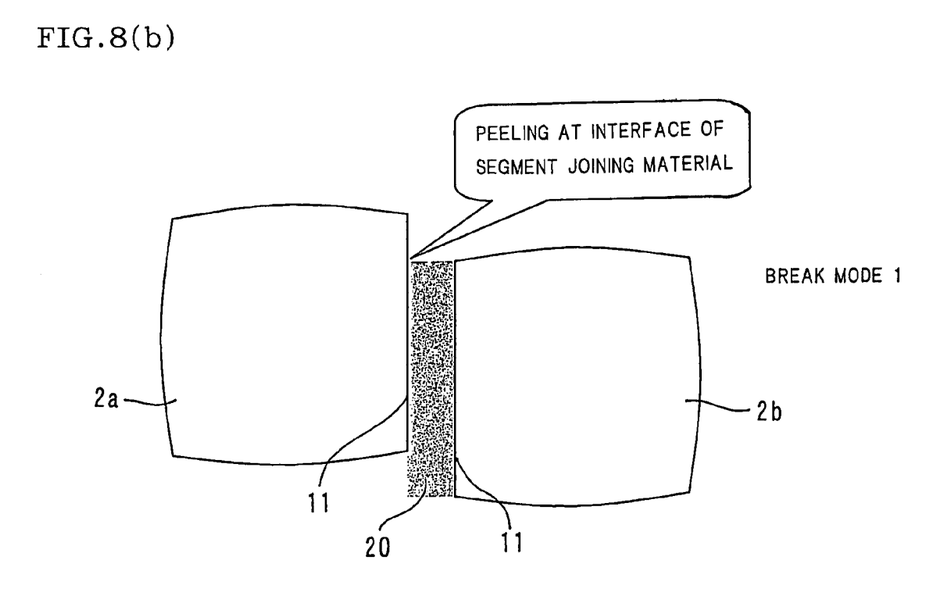
Figure 8C:
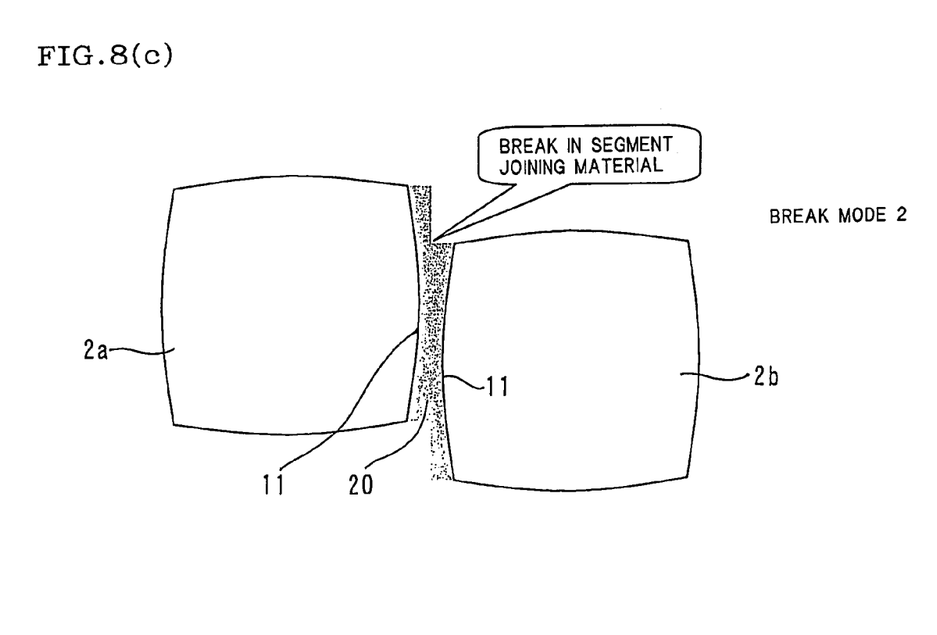
Figure 9A:
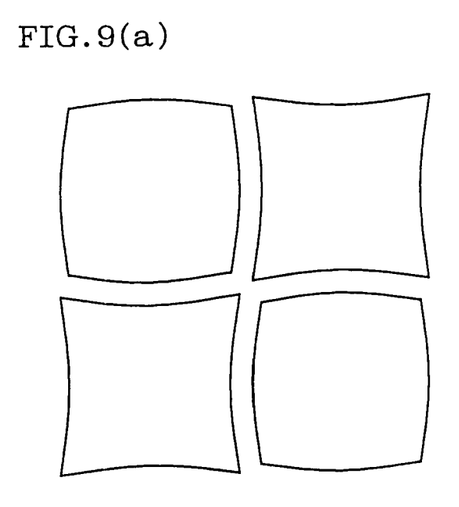
FIG. 9 is an explanatory view schematically illustrating an example of a combination of sides of the cross-sectional shapes of adjacent honeycomb segments in a direction perpendicular to the axial direction thereof in which sides are formed of the combination of a recess and a projection.
Figure 9B:
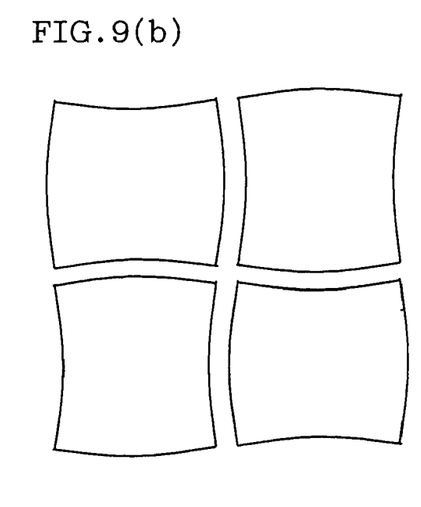
Figure 9C:
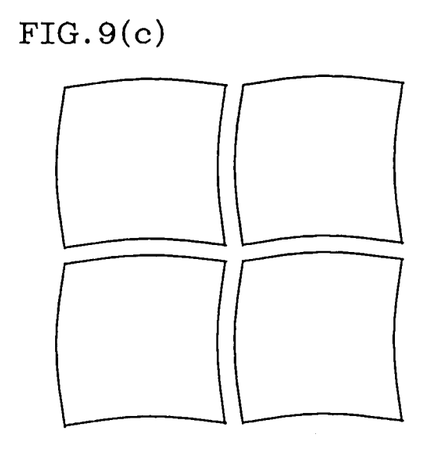
Figure 9D:
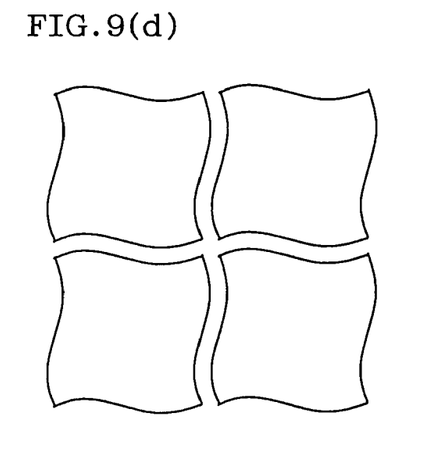

The break mode of the joining material layer 20 between the honeycomb segments 2 (2a, 2b) adjacent to each other will be described referring to FIGS. 8(a) to 8(c). As shown in FIG. 8(a), assume that external forces X, Y in opposite directions perpendicular to the axis direction of the honeycomb segment are applied to the respective honeycomb segments 2a, 2b adjacent to each other. When the curvature radius of the sides 11 is varied from the case where the curvature radius of the sides 11 is large, as shown in FIG. 8(b), to the case where the curvature radius of the sides 11 is small, as shown in FIG. 8(c), the break strength (joining strength) increases, and also, the situation changes from the peeling of the joining material layer 20 at the interface thereof, as shown in FIG. 8(b) to the break of the joining material layer 20 itself, as shown in FIG. 8(c).

As a material for the honeycomb segments 2, at least one material selected from the group consisting of silicon carbide, a silicon-silicon carbide based composite material, silicon nitride, cordierite, mullite, alumina, spinel, a silicon carbide-cordierite based composite material, a silicon-silicon carbide composite material, lithium aluminum silicate, aluminum titanate, and Fe—Cr—Al based metal is preferably used from viewpoints of strength and heat resistance. In particular, silicon carbide or a silicon-silicon carbide based composite material is preferred.

Preparation of the honeycomb segment 2 is made by adding a binder such as methyl cellulose, hydroxyprppoxyl cellulose, hydroxyethyl cellulose, carboxymethyl cellulose, polyvinyl alcohol or the like, a surfactant, water as a solvent and the like to one or more materials suitably selected from the above; preparing a plastic green body; performing extrusion molding on the green body in the above shape; drying the formed green body with microwaves, hot air or the like; and then sintering the resulting green body.

As a filling material 7 used for plugging of the cell 5, a similar material as that for the honeycomb segment 2 may be used. Plugging with the filling material 7 is made by immersing the end surface of the honeycomb segment 2 in the slurry-type filling material 7 with the non-plugged cell 5 being masked, thus filling the open cell 5 with the filling material 7. The filling process of the filling material 7 may be made before or after firing that takes place after the forming of the honeycomb segment 2 although the filing process is preferably made before firing since only one firing process is required.

Figure 1:
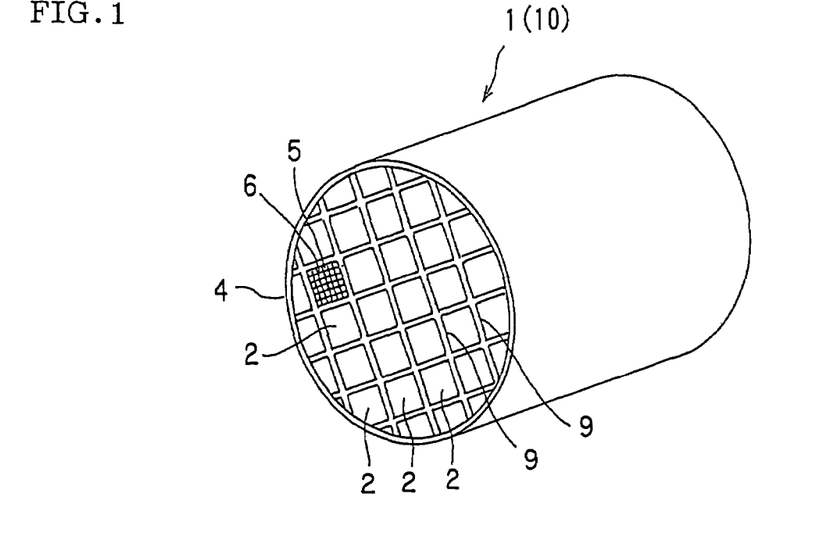
FIG. 1 is a schematic perspective view of an embodiment of a honeycomb structure according to the present invention (with the entire structure having a circular cross-sectional shape taken along a plane perpendicular to the center axis)

After the honeycomb segment 2 is prepared in this way, a slurry-type joining material 9 is applied to the outer peripheral surface of the honeycomb segment 2, a plurality of honeycomb segments 2 are assembled together so as to form a predetermined three-dimensional shape (whole structure of the honeycomb structure 1), and the honeycomb segments 2 are crimped in the combined state and then heated and dried. In this way, the joined body formed of a plurality of honeycomb segments 2 integrally joined together is prepared. After that, the joined body is ground into the above-mentioned shape and the outer peripheral surface is coated with the coating material 4, followed by drying with heat. In this way, the honeycomb structure 1 shown in FIG. 1 is prepared.

The joining material layer 9 used in this invention is applied to the outer peripheral surface of the honeycomb segments 2 to join the honeycomb segments 2 together. The joining material 9 may be applied to the outer peripheral surface of each of the honeycomb segments 2 adjacent to each other, but may be applied to only one of the corresponding outer peripheral surfaces of the honeycomb segments 2 adjacent to each other.

Such application on one of the corresponding surfaces is preferable since this approach saves the amount of the joining material layer 9 used. The thickness of the joining material 9 is determined in consideration of the joining force between the honeycomb segments 2 and selected for example in the range of 0.2 mm to 4.0 mm, arbitrarily.

The joining material layer 9 used in this invention preferably contains ceramics as a main component as well as a particulate filler. As the joining material layer 9 and the outer peripheral coating layer 4, the same material may be used. Ceramics contained as a main component in the joining material layer 9 and the outer peripheral coating layer 4 in the embodiment may be ceramics such as silicon carbide, silicon nitride, cordierite, alumina and mullite. A colloidal sol such as a colloidal silica or colloidal alumina, or a metallic fiber of a pore-forming agent if necessary, may be added to the ceramics.

The outer peripheral coating layer 4 is applied to the outer peripheral surface of the joined body of the honeycomb segment 2 and functions so as to protect the outer peripheral surface of the honeycomb segment 2. The thickness of the outer peripheral coating layer 4 is suitably selected for example in the range of 0.1 mm to 1.5 mm.

A particulate filler contained in the joining material layer 9 and the outer peripheral coating layer 4 may be a filler made of an inorganic material or an organic material. A specific example of an inorganic material may be glass beads or a fly-ash balloon. A specific example of an organic material may be starch or a foamed resin, etc.

A particulate filler preferably has an average diameter of 10 to 300 μm, more preferably 15 to 250 μm, and most preferably 20 to 200 μm. The ratio of the long center axis to the short center axis of a particulate filler is preferably in the range of 1.0 to 4.0 and, more preferably, the particulate filler is a perfect sphere. A particulate filler is preferably contained in the joining material layer 9 and the outer peripheral coating layer 4 in the ratio of 20 to 70 volume %, more preferably in the ratio of 25 to 65 volume %, and most preferably 30 to 60 volume %. A particulate filler preferably has a hollow structure. The use of a particle having a hollow structure (hollow particle) ensures that the density of the joined part and outer peripheral surface formed by hardening of the joining material layer 9 and the outer peripheral coating layer 4 is reduced thus decreasing the Young's modulus. This enhances the thermal shock resistance of the joined part and the outer peripheral surface thus suppressing a crack in use.

The joining material layer 9 and the outer peripheral coating layer 4 may further contain in addition to the above-mentioned ceramics and particulate filler, at least one type selected from a group consisting of inorganic particles, oxide fibers, and colloidal oxides in the ratio of 50 to 60 mass %. By containing such a component, it is possible to enhance the properties of the joining material layer 9 and the outer peripheral coating layer 4. The inorganic particle may be at least one type of ceramics selected from a group consisting of silicon carbide, silicon nitride, cordierite, alumina, mullite, zirconia, zirconium phosphate, aluminum titanate, and titania; an Fe—Cr—Al based metal; a nickel based metal; metallic Si; SiC or the like. The oxide fiber may be an aluminosilicate fiber and another type of fiber. The colloidal oxide may be a silica gel or alumina sol.

The thermal conductivity of the joining material layer 9 and the outer peripheral coating layer 4 is preferably 0.1 to 5.0 W/m·k. The thermal expansion coefficient of the joining material layer 9 and the outer peripheral coating layer 4 is preferably low, in the range of $1\times10^{-6}$ to $8\times10^{-6}/°$ C. in order to prevent a crack caused by thermal impact.

EXAMPLE

The present invention will be described in detail by way of examples. Note that the invention is by no means limited to the examples.

1. Preparation of a Honeycomb Segment

As materials for a honeycomb segment, a silicon carbide powder and a silicon powder are mixed in the mass ratio of 80:20, starch and a foamed resin are added as pore-foaming agents, and methyl cellulose and hydroxypropoxylmethyl cellulose, and a surfactant and water are added to form a plastic green body. The green body is subjected to extrusion molding and dried with microwaves and hot air to obtain a formed honeycomb segment body having a partition wall thickness of 310 µm, a cell density of about 46.5 cells/cm$^2$ (300 cells/in$^2$), a regular square cross section whose one side is 35 mm, and a length of 152 mm. Both end surfaces of the cells of the formed honeycomb segment body are plugged so that the end surface will appear in a checkered pattern. That is, plugging is made so that adjacent cells can be plugged at the ends opposite to each other. The same material as that for the honeycomb segment is used as an plugging material. Both end surfaces of the cells are plugged and the formed honeycomb segment formed is dried, degreased in an atmosphere of about 400° C., fired at about 1450° C. in an Ar inert atmosphere, and then have Sic crystal grains bonded with Si to obtain a honeycomb segment having a porous structure.

2. Preparation of a Joining Material

A 40 mass % silicon carbide powder as an inorganic particle, a 30 mass % of 40 mass % silica gel aqueous solution as an inorganic binder, a 1 mass % clay, and an 29 mass % aluminosilicate fiber are mixed together, then kneaded for 30 minutes with water using a mixer to obtain a joining material.

3. Manufacture of a Honeycomb Structure

Next, the above joining material is used to join honeycomb segments, which is dried for two hours at 200° C. The outer peripheral part is then ground in a cylindrical shape and a coating material is applied thereto and the resulting honeycomb segments are subjected to heat treatment for two hours at 500° C. to obtain a honeycomb structure (SiC-DPF structure).

Example 1

Figure 10:
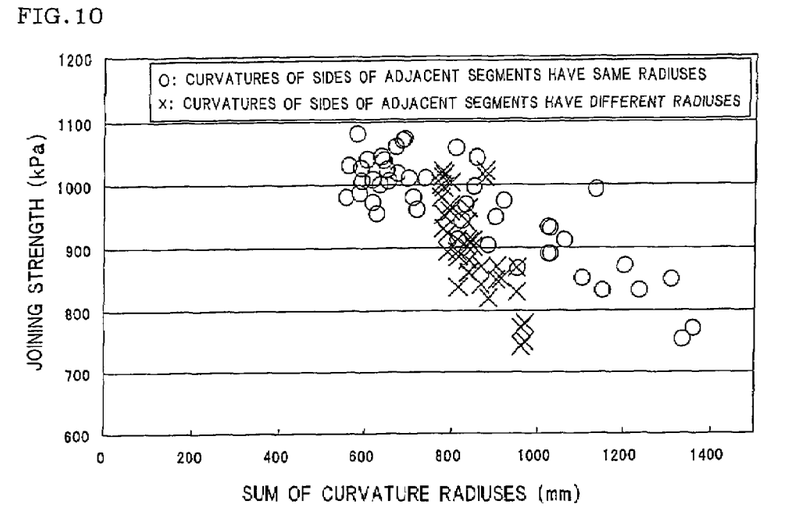
FIG. 10 is a graph showing the relationship between the sum of the curvature radiuses and the joining strength as a result of Example 1.

Total 100 honeycomb segment samples with various curvature radiuses of the sides of the cross-sectional shape in a direction perpendicular to the axial direction of the honeycomb segments were provided. The honeycomb segments were joined together with the joining material to prepare 50 joined bodies formed of pairs of honeycomb segments and the jointing strength was measured. The result is shown in FIG. 10. As understood from FIG. 10, the joining material layer itself broke under the curvature radius of 400 mm or below and the increase in strength was saturated.

Example 2

Figure 11:
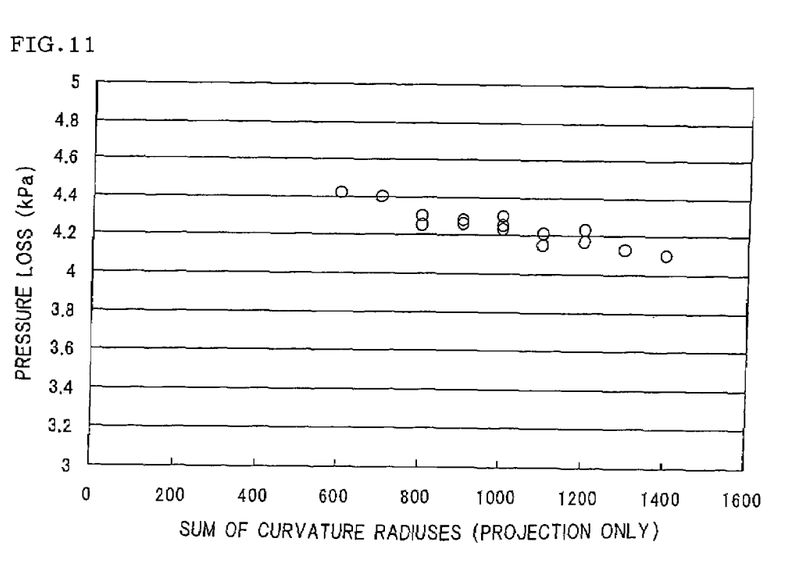
FIG. 11 is a graph showing the relationship between the sum of the curvature radiuses and the pressure loss as a result of Example 2.

Honeycomb segments in which sides of cross-sectional shapes in a direction perpendicular to the axial direction thereof have a projecting shape and curvature radiuses of 300 mm, 400 mm, 500 mm, 600 mm, and 700 mm were used in combination (for example, 300 mm and 300 mm, 400 mm and 500 mm) to manufacture the honeycomb structures (SiC-DPF structures) in a manner described as above, and the pressure loss of the honeycomb structure was measured. The result is shown in FIG. 11.

From the result shown in FIG. 11, when the sum of the curvature radiuses (for example, in case the ratio of use of the combination of honeycomb structures with curvature radiuses of 400 mm and 500 mm is 50 percent, the sum is 900 mm) is equal to or below 700 mm, the area of the joined part increases compared with the combination with the lowest pressure loss (combination of honeycomb structures with curvature radius of 700 mm and 700 mm), and the pressure loss increases by 5 percent so that the drop in the performance from the viewpoint of pressure loss is no longer negligible.

Example 3

Honeycomb segments in which sides of cross-sectional shapes in a direction perpendicular to the axial direction of honeycomb segment are formed of a combination of a projection and a recess and have the same curvature radiuses were used to manufacture honeycomb structure (SiC-DPF structure), and the pressure loss of the honeycomb structure was measured. The result is shown in FIG. 12.

Figure 12:
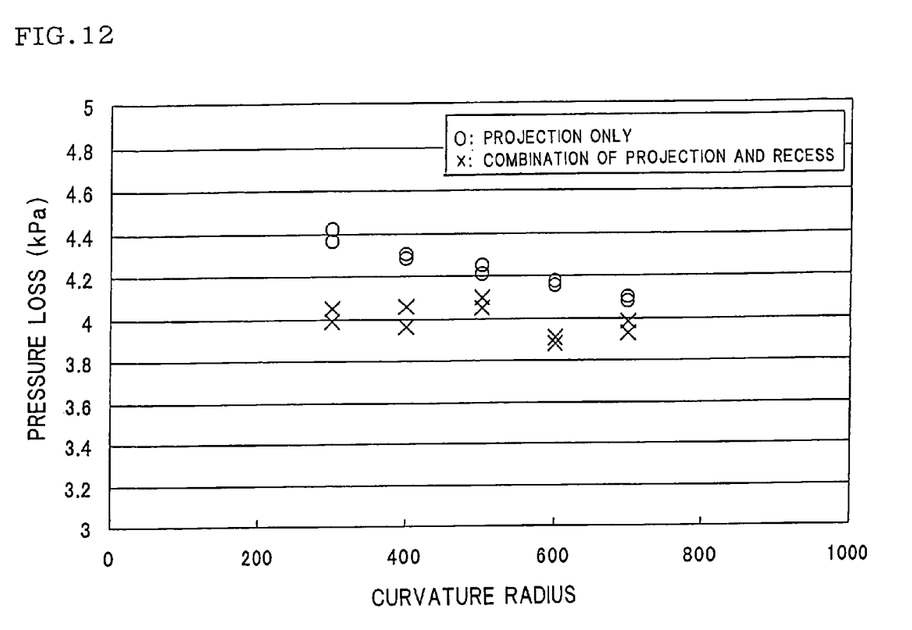
FIG. 12 is a graph showing the relationship between the curvature radius and the pressure loss as a result of Example 3.

As understood from the result shown in FIG. 12, the pressure loss shows an almost constant value irrespective of the curvature radius. At the curvature of 300 mm, the sides having the projection only shows an increase in pressure loss by 10 percent compared with the sides having the combination of a projection and a recess, so if the combination of a projection and a recess is 50 percent or above, the pressure loss can be suppressed below 5 percent.

The honeycomb structure according to the invention is useful as an exhaust gas trapping filter, for example, a diesel particulate filter (DPF) for trapping particulate matter (particulates) contained in the exhaust gas from a diesel engine etc. to remove.

What is claimed is:

1. A honeycomb structure comprising:
   a honeycomb segment joined body having a plurality of honeycomb segments joined integrally at respective joining surfaces via a joining material layer; and
   an outer peripheral coating layer covering an outer peripheral surface of the honeycomb segment joined body, the honeycomb structure having such a structure that a plurality of cells acting as fluid passageways are disposed in parallel to each other in a direction of a center axis;
   wherein sides of a cross-sectional shape of said plurality of honeycomb segments taken in a direction perpendicular to the center axis direction having at least one curvature, and
   wherein the sides of the cross-sectional shapes perpendicular to the center axis direction of the honeycomb segments adjacent to each other are formed of a complementary set of a recess and a projection.

2. The honeycomb structure according to claim 1, wherein a curvature radius of the curvature equal to or greater than 1 falls within the range of 300 to 700 mm.

3. The honeycomb structure according to claim 1, wherein the sum of the curvature radiuses of the sides of the cross-sectional shapes perpendicular to the center axis direction of the respective honeycomb segments adjacent to each other via the joining material layer is 800 to 1400 mm.

4. The honeycomb structure according to claim 1, wherein the ratio of the combination of the recess and the projection at the sides of the cross-sectional shapes is 50 percent or more.

5. The honeycomb structure according to claim 3, wherein the ratio of the combination of the recess and the projection at the sides of the cross-sectional shapes is 50 percent or more.

6. The honeycomb structure according to claim 1, wherein the honeycomb segment has an approximately rectangular cross-sectional shape.

7. The honeycomb structure according to claim 3, wherein the honeycomb segment has an approximately rectangular cross-sectional shape.

8. The honeycomb structure according to claim 1, wherein the honeycomb segment has an approximately rectangular cross-sectional shape.

9. The honeycomb structure according to claim 3, wherein the honeycomb segment has an approximately rectangular cross-sectional shape.

* * * * *